Dec. 17, 1935.    R. I. SCHONITZER    2,024,887
DOOR SUPPORT
Original Filed Aug. 3, 1933    2 Sheets-Sheet 1
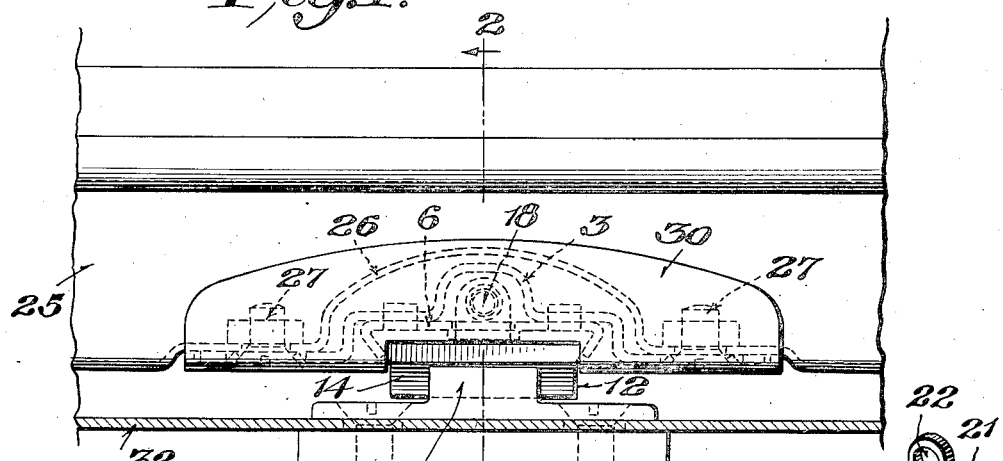
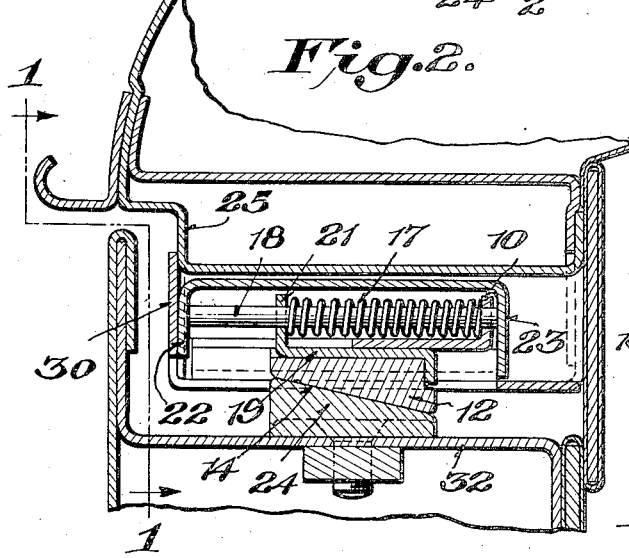
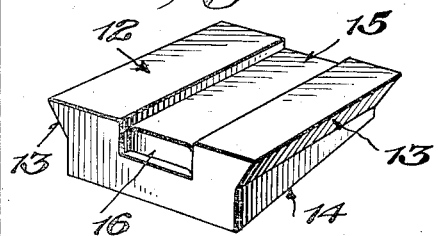
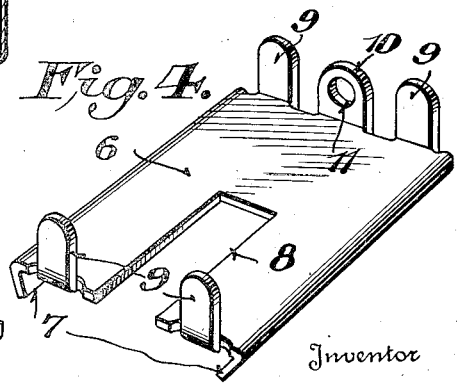
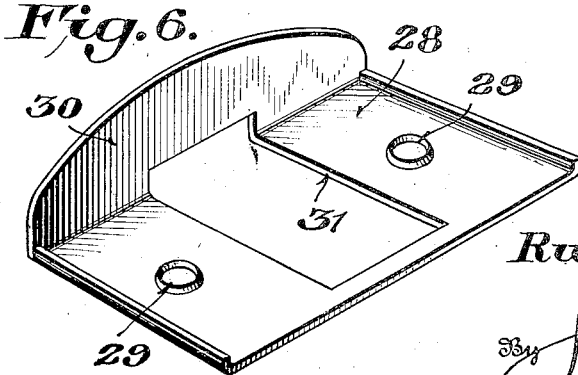
Inventor
Rudolph I. Schonitzer,
his Attorneys Dec. 17, 1935.  R. I. SCHONITZER  2,024,887
DOOR SUPPORT
Original Filed Aug. 3, 1933  2 Sheets-Sheet 2
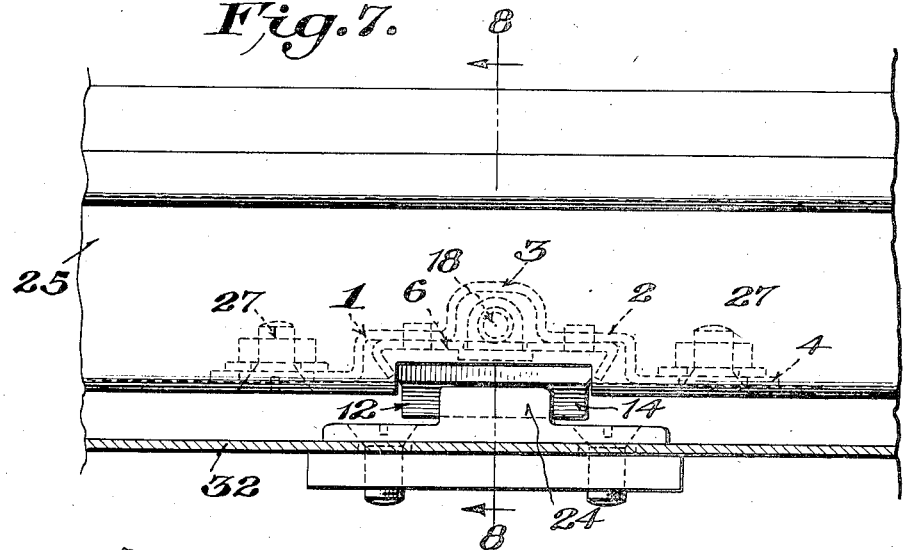
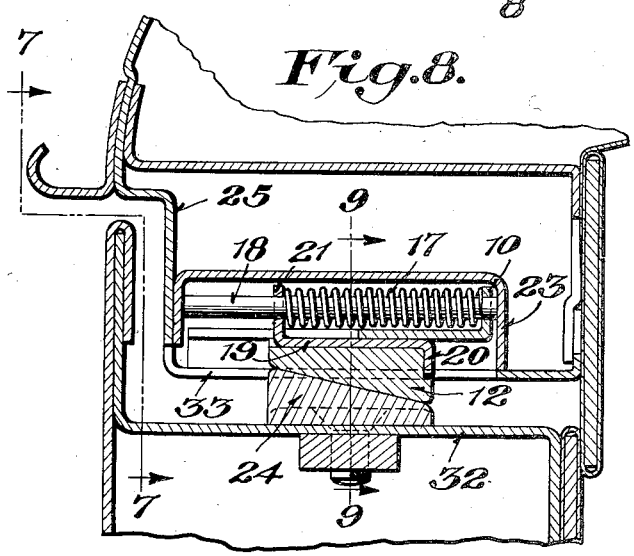
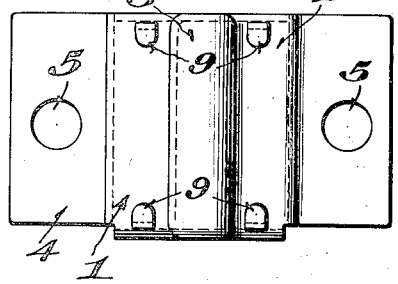
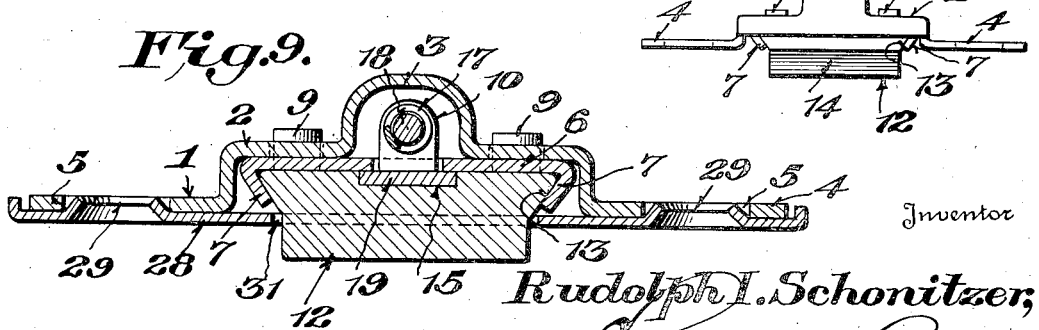
Inventor
Rudolph I. Schonitzer Patented Dec. 17, 1935

2,024,887

UNITED STATES PATENT OFFICE 2,024,887

DOOR SUPPORT

Rudolph I. Schenitzer, Cleveland, Ohio

Application August 3, 1933, Serial No. 683,516
Renewed August 23, 1935

11 Claims. (Cl. 16—85)

This invention is a door support such as is shown in my co-pending application, Serial No. 606,941, filed April 22, 1932, wherein the parts of the device have been disclosed as die castings.

The prime object of the present invention is to embody the features of invention of my door support in a structure made up of metal stampings.

It is also an object of the invention to enable the convenient and inexpensive production of the parts of the device and to enable the convenient assemblage thereof into an operative device which may be conveniently mounted and which will act effectively to hold a door rigidly in place and prevent rattling thereof, and is particularly applicable to the doors of automobile bodies.

With these and other objects in view, the invention consists in the combination and arrangement of parts as will be hereinafter more fully described, illustrated in the accompanying drawings, and particularly pointed out in the appended claims, it of course being understood that changes in the form, proportion, size and minor details may be made within the scope of the claims, without departing from the spirit or sacrificing any of the advantages of the invention.

In the drawings:

Figure 1 is a front elevation illustrating the door support of the present invention applied at the top of an automobile door and mounted on the roof rail of an automobile body and applied thereto from the exterior thereof;

Figure 2 is a cross sectional view on the line 2—2 of Figure 1;

Figure 3 is a detail perspective view of the movable wedge member of the door support;

Figure 4 is a detail perspective view of the channel shaped guide member for the movable wedge member;

Figure 5 is a perspective view of one of the elements of the device;

Figure 6 is a perspective view of the cover plate;

Figure 7 is a view similar to Figure 1, showing the device of the present invention mounted from the interior of the roof rail of an automobile body, taken on the line 7—7 of Figure 8;

Figure 8 is a cross sectional view on the line 8—8 of Figure 7;

Figure 9 is a cross sectional view on the line 9—9 of Figure 8;

Figure 10 is an exterior plan view of the base member or attaching member of the device;

Figure 11 is a front edge view of the device with the slidable wedge member in place.

As in the device of my co-pending application, the present embodiment of my invention includes a base member or attaching member designated generally as 1, and consisting of a metal plate stamped to provide a centrally disposed rectangular housing portion 2, the top or back of which is stamped to provide a central longitudinal channel 3. The end portions of the plate 1 project at opposite sides of the housing portion 2 and constitute attaching flanges 4, each of which is provided with a centrally disposed opening 5 for the reception of a fastening means to secure the base member in place.

Disposed within the housing portion 2 of the base member 1 is a channel member 6 consisting of a flat plate stamped to provide inwardly directed flanges 7 extending along the longitudinal edges of the member and defining a guide channel having what is in effect under-cut longitudinal sides. Extending longitudinally of the body of the channel member is a slot 8 which opens through one end of the member and thereby produces a bifurcation. A pair of ears 9 are stamped up at opposite ends of the member and are designed to extend through slits or openings in the top or back of the housing portion 2 of the base member and then bent over upon the outside thereof, as well shown in Figures 9, 10, and 11 of the drawings, so as to rigidly connect the channel member 6 with the base or attaching member. Another ear 10 is stamped up between the ears 9 at that end of the channel member 6 which is opposite the open end of the slot 8, and this ear 10 is provided with an opening 11 for a purpose as will hereinafter be explained.

The slidable wedge member 12 of the present device is slidably mounted in and carried by the guide member 6, said wedge member being provided with beveled or under-cut longitudinal flanges 13 slidably received within the grooves or channels provided by the flanges 7 of the guide member 6. The top or back face of the slidable wedge member is straight and parallel with the back of the guide member 6, while the lower or outer face 14 of the wedge is inclined in the longitudinal direction of the guide member 6. In the top or inner face of the wedge member there is provided a longitudinal groove or recess 15 extending the entire length of the member, and in the thicker end of the wedge there is an end recess 16 communicating with the longitudinal recess 15.

For the purpose of applying tension to the wedge member 12 there is provided a helical spring 17 mounted upon a rod 18 which has one end supported in the opening 11 of the ear 10 on the guide member 6. A connection between the wedge member 12 and the spring 17 is provided by means of a link 19 lying in the recess 15 in the straight back of the wedge 12. One end of the link is bent or stamped to provide a shoulder or projection 20 lying in the recess 16, while the other end of the link is stamped to provide an ear 21 having an opening 22 through which one end portion of the rod 18 passes. The spring 17 bears at one end against the fixed abutment provided by the ear 10 on the guide member 6, while its opposite end bears against the abutment provided by the ear 21 on the link 19, whereby the wedge 12 is normally under tension resisting longitudinal movement of the wedge in what would be termed the inward direction of movement thereof. The rod 18 bears at opposite ends against the end walls 22 and 23 of the housing portion 2 of the base or attaching member 1, and together with the spring 17 and the ears 10 and 21 is received within the outstanding channel portion 3 of the housing 2. The rod 18 is supported laterally in the ears 10 and 21, and is held against endwise movement by the end walls 22 and 23 of the housing.

As well shown in Figure 9 of the drawings, it will be seen that the inclined, or beveled and active face portion of the wedge member 12 projects outwardly through the open side of the channel guide member 6 so as to be in position for active engagement with a cooperating fixed wedge member such as shown at 24, in Figures 1, 2, 7 and 8 of the drawings.

For an understanding of the mounting and operation of the present device, reference is made to Figures 1 and 2 of the drawings, wherein the reference character 25 designates the roof rail of an automobile body, the said rail being shown as a channel member as commonly employed in the construction of all-metal automobile bodies. This roof rail is stamped or pressed to provide an upstanding recess designated at 26, as shown in dotted lines in Figure 1 of the drawings, and the device of the present invention is placed upwardly into this recess or seat and is secured in place by means of suitable fastenings 27 extending through the openings 5 in the attaching flanges of the base member 1 and also through suitable openings in the bottom of the roof rail 25.

It is preferred to employ a cover plate, such as shown at 28 in Figure 6 of the drawings, to the under side of the device after it has been placed in position as shown in Figures 1 and 2, so as to cover as much as possible of the device without interfering with the operation thereof. This cover plate has a pair of openings 29 to receive the fastening devices 27, and along one longitudinal edge thereof there is an upstanding flange 30 constituting a face plate closing the open outer end of the seat or recess 26 formed in the bottom of a roof rail.

The cover plate is also provided with a slot or opening 31 through which the slidable wedge member 12 projects downwardly so that its lower active inclined face may be in position for cooperative engagement with the inclined face of the accompanying stationary wedge member 24 suitably secured to the top rail 32 of the automobile door. It will, of course, be understood that there is the usual clearance space between the top rail 32 of the door and the roof rail 25 of the frame of the automobile body, and this space is utilized for the mounting and reception of the stationary wedge member 24 and the movement of the slidable wedge member 12.

The operation of the device will be understood by reference to Figures 1 and 2 of the drawings, the left hand side of Figure 2 being shown as the outer side of the door. When the door is open, the slidable wedge member 12 will be moved to the left, or in other words to the front of the device under the influence of the spring 17 and until stopped by the front wall 22 of the housing 2. When the door 32 is swung to the right, as in closing, the stationary wedge member 24 will engage the slidable wedge member 12 and by reason of the frictional engagement between the inclined faces of the two wedge members, the slidable wedge member 12 will be moved to the right against the tension of the spring 17, and when the door reaches its closed position the combined effect of the two wedge members is to apply pressure downwardly in the plane of the door so as to rigidly bind the latter within its frame and hold the door against rattling movements. It will, of course, be understood that, as disclosed in my prior application, Serial No. 606,941, suitable cooperating wedges are provided between the bottom edge of the door and the bottom sill of the door frame in order to resist the downward thrust of the device at the top of the door and thus tightly bind the door within its frame.

In Figures 7 and 8 of the drawings I have shown a slightly different mounting of the device, wherein the struck-up portion 26 in the roof rail is omitted, and the present device is applied downwardly through the open top of the channel shaped rail 25, the bottom of the latter being provided with a slot or opening 33 in which the slidable wedge member 12 may move and through which it may project downwardly into cooperative relation with the stationary wedge member 24. In this application of the device a cover plate is not necessary as the door support is housed within the channel member 25.

In order that the present device may be self-lubricating, I may provide the inner face of the guide member 6 with a hardened surface upon which the wedge member 12 slides. The latter may be of softer material, preferably some self-lubricating metallic composition, so that ready sliding of the wedge member 12 may be insured without requiring the supplying of a lubricant to the contacting surfaces of the wedge of the guide member. Also the link 19 may be of softer metal than the wedge member 12 so as not to interfere with the ready and proper sliding movements of the wedge. With the wedge member made of a self-lubricating metallic composition, it would be impracticable to form an abutment thereon for engagement with the spring 17, because the abutment would in all probability crack or break off in the making thereof or would break off under the stress and strain of repeated use, because of the nature of the material, and so I have provided the link 19 as a connection between the slidable wedge and the spring, thus enabling the use of self-lubricating material for the wedge and at the same time insuring a strong and durable connection between the wedge and the spring.

What is claimed is:

1. A door support, comprising an attaching member having a housing portion open at one side and attaching flanges, a separate guide channel member secured within the housing, a wedge member within the housing, slidable in the guide channel and exposed through the open side of the housing, and a spring tension device for the wedge member.

2. A door support, comprising an attaching member having a housing portion closed at its back and open at its front and provided with attaching flanges, a separate guide channel secured within the housing, a wedge member slidable in the guide channel and exposed through the open front of the housing, and a spring tension device for the wedge member located within the housing and between the back of the wedge member and the back of the housing.

3. A door support of the character described comprising an attaching member having a housing portion and opposite attaching flanges, the housing having a closed back and an open front, the back of the housing having a channel portion within the housing, a separate guide channel member secured within the housing, a wedge member slidable in the guide channel, and a spring tension device for the wedge member mounted in the channel portion of the housing.

4. A door support of the character described comprising an attaching member having a housing portion and attaching flanges, the housing having a channel portion therein, a guide channel secured within the housing, a wedge member slidable in the guide channel, a helical spring within the channel of the housing, a supporting and guiding rod for the spring, a stationary abutment within the channel portion of the housing and against which one end of the spring bears, and another abutment provided upon the wedge and bearing against the opposite end of the spring.

5. A door support of the character described comprising an attaching member having a housing portion and opposite attaching flanges, the housing having a closed back and an open front and the back of the housing being provided with a channel portion, a separate guide channel member secured within the housing, a wedge member slidable in the guide channel, a helical spring within the channel portion of the housing, a stationary abutment within the channel portion of the housing and against which one end of the spring bears, and a connection between the wedge and the opposite end of the helical spring consisting of a link member lying on the back of the wedge and having one end provided with a transverse shoulder lying across one end of the wedge, the opposite end of the link having a transverse shoulder constituting an abutment lying against the said opposite end of the spring.

6. A door support of the character described comprising an attaching member having a housing portion and attaching flanges, the housing being provided with a channel portion, a rod extending longitudinally within the channel of the housing, a guide channel secured within the housing and provided with a transverse abutment member having an opening for receiving the rod, a helical spring embracing the rod and bearing at one end against the abutment, a wedge slidable in the guide channel and provided with a transverse abutment having an opening receiving the rod and also bearing against the other end of the spring.

7. A door support of the character described comprising an attaching member having a housing portion and attaching flanges, the housing being provided with a channel, a rod extending longitudinally within the channel, a helical spring on the rod, a guide channel secured within the housing and provided with a transverse abutment portion having an opening receiving the rod and engaging one end of the spring, a wedge slidable in the guide channel, and a connection between the spring and the wedge in the form of a link lying in a recess in the back of the wedge, one end of the link having a transverse shoulder lying in a recess in one end of the wedge, the opposite end of the link having a transverse shoulder lying against the other end of the spring and having an opening receiving the rod.

8. A door support of the character described comprising an attaching member formed from a metal plate stamped to provide a housing portion and attaching flanges, the housing being closed at its back and open at its front, a plate metal guide channel secured within the housing, a wedge member slidable in the guide channel and exposed through the open front of the housing, and a spring tension device for the wedge member.

9. A door support of the character described comprising an attaching member formed from a metal plate stamped to provide a housing portion having a channel therein and opposite attaching flanges, the back of the housing having openings therein, a plate metal guide channel located in the housing and provided with ears projecting through the openings in the back of the housing and deformed to secure the guide channel to the housing, a wedge slidable in the guide channel, and a spring tension device for the wedge member mounted within the channel portion of the housing.

10. A door support of the character described comprising an attaching member formed from a metal plate stamped to provide a housing portion having a closed back and an open front, opposite attaching flanges and a channel portion in the housing, the back of the housing being provided with openings at opposite sides of the channel portion, a plate metal guide channel located within the housing and provided with attaching ears projecting through the openings in the back of the housing and deformed to secure the guide channel to the housing, said guide channel also having an abutment lying in the channel of the housing and provided with an opening, the guide channel also having a longitudinal slot in alignment with the abutment, a wedge slidable in the guide channel, a link lying upon the back of the wedge member, one end of the link having a lateral shoulder lying against one end of the wedge, the other end of the link having a lateral abutment projecting outwardly through the slot in the guide channel and provided with an opening, a rod extending through the opening in the two abutments and engaging at its ends the end walls of the channel portion of the housing, and a helical spring embracing the rod and bearing at opposite ends against the respective abutments.

11. A door support of the character described comprising an attaching member having a housing portion and attaching flanges, the housing having a closed back and an open front, a guide channel secured within the housing, a wedge member slidable in the guide channel with its active face exposed through the open front of the housing, a spring tension device for the wedge member located within the housing and between the wedge member and the back of the housing, and a cover plate secured to the flanges of the attaching member, provided with an opening through which the wedge member projects and slides, and also provided with a lateral flange constituting a face plate lying across and projecting beyond one end of the housing and its attaching flanges.

RUDOLPH I. SCHONITZER.